US008824885B2

(12) United States Patent
Liu et al.

(10) Patent No.: US 8,824,885 B2
(45) Date of Patent: Sep. 2, 2014

(54) PROTECTION DEVICE AND PROTECTION METHOD FOR OPTICAL NETWORK

(75) Inventors: Zhennan Liu, Shenzhen (CN); Yong You, Shenzhen (CN)

(73) Assignee: ZTE Corporation, Shenzhen, Guangdong (CN)

(*) Notice: Subject to any disclaimer, the term of this patent is extended or adjusted under 35 U.S.C. 154(b) by 434 days.

(21) Appl. No.: 13/394,579

(22) PCT Filed: Jun. 21, 2010

(86) PCT No.: PCT/CN2010/074181
§ 371 (c)(1),
(2), (4) Date: Mar. 7, 2012

(87) PCT Pub. No.: WO2011/029327
PCT Pub. Date: Mar. 17, 2011

(65) Prior Publication Data
US 2012/0170925 A1 Jul. 5, 2012

(30) Foreign Application Priority Data

Sep. 8, 2009 (CN) .......................... 2009 1 0090693

(51) Int. Cl.
*G02F 1/00* (2006.01)
*H04B 10/032* (2013.01)
(52) U.S. Cl.
CPC .................................. *H04B 10/032* (2013.01)
USPC .............. 398/5; 398/3; 398/4; 398/7; 398/33; 398/10; 398/17; 398/34; 398/38; 398/45; 398/48; 370/216; 370/217; 370/218; 370/225; 370/228
(58) Field of Classification Search
USPC ......... 398/1, 2, 3, 4, 5, 7, 8, 9, 10, 12, 13, 14, 398/17, 19, 25, 27, 33, 34, 38, 45, 48, 49, 398/79, 58, 59, 83, 82, 57; 370/216, 217, 370/218, 221, 222, 225, 227, 228, 224, 535, 370/242, 248, 241
See application file for complete search history.

(56) References Cited

U.S. PATENT DOCUMENTS 8,103,161 B2* 1/2012 Li ..................................... 398/4
8,204,374 B2* 6/2012 Barnard ........................... 398/4

FOREIGN PATENT DOCUMENTS

| CN | 1422013 A | 6/2003 |
| CN | 1691550 A | 11/2005 |
| CN | 101640818 A | 2/2010 |
| WO | 2006018831 A1 | 2/2006 |

OTHER PUBLICATIONS

International Search Report for PCT/CN2010/074181, English translation attached to original, Both Completed by the Chinese Patent Office on Aug. 30, 2010, All together 9 Pages.

* cited by examiner

*Primary Examiner* — Hanh Phan
(74) *Attorney, Agent, or Firm* — Brooks Kushman P.C.

(57) ABSTRACT

Optical network protection devices and protection methods including: a working line; a protection line; a determination module configured to determine the protection type of optical network; a first judgment module configured to judge whether the working line is normal according to performance parameter values of service signal in the working line and switching conditions configured for multiplexing section protection when the protection type of optical network is the multiplexing section protection; a second judgment module, configured to judge whether the working line is normal according to performance parameter values of service signal in the working line and switching conditions configured for channel section protection when the protection type of optical network is the channel section protection; a switching module, configured to take the service signal in the protection line as an output signal when working line is abnormal.

18 Claims, 5 Drawing Sheets

PROTECTION DEVICE AND PROTECTION METHOD FOR OPTICAL NETWORK

CROSS-REFERENCE TO RELATED APPLICATION

This application is the U.S. national phase of PCT Appln. No. PCT/CN2010/074181 filed Jun. 21, 2010 which claims priority to Chinese Application No. 200910090693.7 filed Sep. 8, 2009, the disclosures of which are incorporated in their entirety by reference herein.

TECHNICAL FIELD

The present invention relates to the wavelength division optical network technology, and more especially, to a protection device and a protection method for an optical network.

BACKGROUND OF THE RELATED ART

With the rapid development of optical fiber communication technology, the self-healing protection ability of the wavelength division optical network has become increasingly important. Thanks to the protection switching, the wavelength division optical network protection can ensure that service will not be interrupted in the case that the device or optical fiber link is abnormal. The wavelength division optical network protection comprises two protection types: multiplexing section protection and channel section protection.

Regardless of whether the wavelength division optical network is based on the channel section protection or the multiplexing section protection, in order to detect whether the working line and the protection line are normal or not, the optical network protection device needs to detect the performance parameter values of the service signal to judge whether the switching conditions are met or not, and when the switching conditions are met, the optical network protection device provides the optical network protection. For example, when using the optical power as the performance parameter, since the optical power thresholds configured for the multiplexing section protection and the channel section protection are different, the hardware devices implementing whether the switching conditions are met or not are also different, that is, when the protection types applied in the wavelength division optical network are different, it needs to configure different types of optical network protection devices, thus the costs are increased.

SUMMARY OF THE INVENTION

In view of this, the embodiment of the present invention aims to provide a protection device and protection method for an optical network, and the protection device and the protection method can adapt to both the multiplexing section protection and the channel section protection.

To solve the aforementioned technical problem, the technical solution of the present invention is accomplished as follows:

an optical network protection device, comprising a working line and a protection line and further comprising:

a determination module, configured to determine a protection type of the optical network;

a first judgment module, configured to judge whether the working line is normal or not according to performance parameter values of service signal in the working line as well as switching conditions configured for multiplexing section protection when the protection type of the optical network is the multiplexing section protection;

a second judgment module, used to judge whether the working line is normal or not according to the performance parameter values of the service signal in the working line as well as the switching conditions configured for channel section protection when the protection type of the optical network is the channel section protection;

a switching module, configured to take the service signal in said protection line as an output signal when the working line is abnormal.

The determination module is specifically configured to detect a structure of the service signal, and determine the protection type of the optical network according to the structure of the service signal.

Said optical network protection device further comprises: a first acquisition module and/or an external information interface, the first acquisition module is configured to acquire the service signal in the working line;

the external information interface is configured to connect with an external network management system; the determination module is further configured to determine the protection type of the optical network according to network configuration data configured by the network management system, or a automatic protection switching instruction signaling sent by the network management system.

The optical network protection device further comprises:

a third judgment module, configured to judge whether the protection line is normal or not according to the performance parameter values of the service signal in the protection line as well as the switching conditions configured for the multiplexing section protection when the protection type of the optical network is the multiplexing section protection;

a fourth judgment module, configured to judge whether the protection line is normal or not according to the performance parameter values of the service signal in the protection line as well as the switching conditions configured for the channel section protection when the protection type of the optical network is the channel section protection.

The switching module is specifically configured to: when the working line is abnormal and the protection line is normal, take the service signal in the protection line as an output signal; and/or, the optical network protection device further comprises: a second acquisition module configured to acquire the service signal in the protection line.

An optical network protection method, applied in the optical network protection device, and the optical network protection device comprises a working line and a protection line, and the method comprises the following steps of:

the optical network protection device determining a protection type of the optical network;

when the protection type of the optical network is the multiplexing section protection, the optical network protection device judging whether the working line is normal or not according to performance parameter values of service signal in the working line as well as switching conditions configured for multiplexing section protection;

when the protection type of the optical network is the channel section protection, the optical network protection device judging whether the working line is normal or not according to the performance parameter values of the service signal in the working line as well as the switching conditions configured for the channel section protection;

when the working line is abnormal, the optical network protection device taking the service signal in the protection line as an output signal.

The optical network protection device determines the protection type of the optical network, which is specifically: the optical network protection device detecting a structure of the service signal, and determining the protection type of the optical network according to the structure of the service signal.

The optical network protection device determines the protection type of the optical network, which is specifically: the optical network protection device determining the protection type of the optical network according to network configuration data configured by network management system or an automatic protection switching instruction signaling sent by the network management system.

The method further comprises:

when the protection type of the optical network is the multiplexing section protection, the optical network protection device judging whether the protection line is normal or not according to the performance parameter values of the service signal in the protection line, as well as the switching conditions configured for the multiplexing section protection;

when the protection type of the optical network is the channel section protection, the optical network protection device judging whether the protection line is normal or not according to the performance parameter values of the service signal in the protection line, as well as the switching conditions configured for the channel section protection.

the optical network protection device switches to the protection line when the working line is abnormal, which is specifically: the optical network protection device taking the service signal in the protection line as an output signal when the working line is abnormal and the protection line is normal.

The embodiment of the present invention has the following beneficial effects:

it is able to determine the protection type of the optical network, and when the protection type of the optical network is the multiplexing section protection, the switching conditions configured for the multiplexing section protection are used to judge whether the working line is normal or not; when the protection type of the optical network is the channel section protection, the switching conditions configured for the channel section protection are used to judge whether the working line is normal or not, that is, the optical network protection device can adapt to both the multiplexing section protection and the channel section protection, thus reducing the types of optical network protection devices, saving the costs, and improving the network configuration efficiency. In addition, the scheme of the present invention can be implemented by software rather than carry out the modification of hardware for the existing optical network protection devices, thus saving the costs.

PREFERRED EMBODIMENTS OF THE PRESENT INVENTION

In the following, in combination with the accompanying drawings and embodiments, the specific embodiments of the present invention will be further described in detail.

Figure 1:
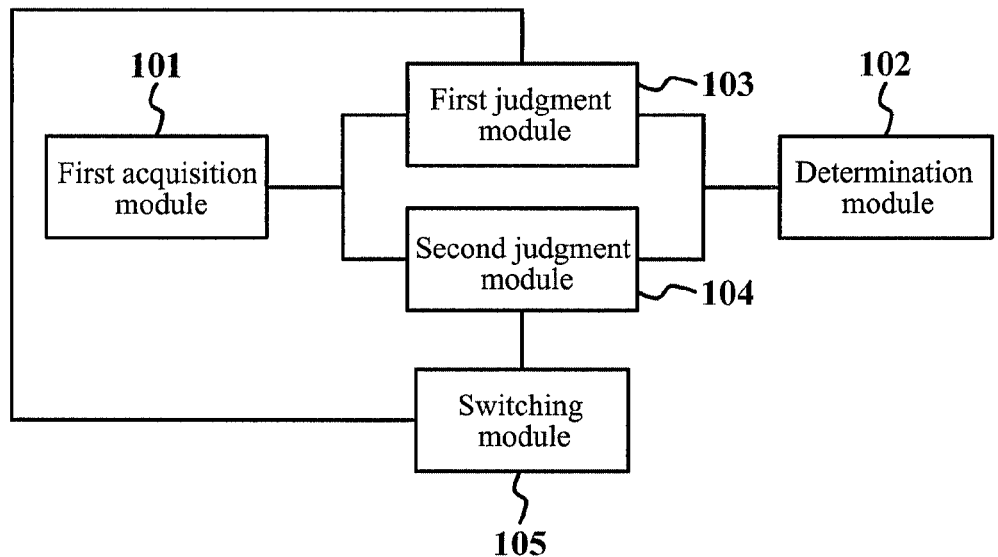
FIG. 1 is a structural schematic diagram of an optical network protection device in accordance with an embodiment of the present invention.

FIG. 1 shows a structural schematic diagram of an optical network protection device in accordance with an embodiment of the present invention. The optical network protection device is applied to the wavelength division optical network, and the optical network protection device comprises: the working line and the protection line, and the working line and the protection line transmit the same service signal, in the case that the working line is normal, the optical network protection device outputs the service signal in the working line, and when abnormality occurs in the working line, the optical network protection device outputs the service signal in the protection line.

The optical network protection device also comprises:

the first acquisition module 101, configured to acquire the service signal in the working line.

the determination module 102, configured to determine the protection type of the optical network, and trigger the corresponding judgment module according to the protection type. The protection type of the optical network comprises two protection types: the multiplexing section protection and the channel section protection. The determination module 102 can determine the protection type of the optical network via a variety of methods: such as through self-detecting, or through the network configuration of the external network management system and so on.

The first judgment module 103 is configured to judge whether the working line is normal or not according to the performance parameter values of the service signal in the working line as well as the switching conditions configured for the multiplexing section protection when the protection type of the optical network is the multiplexing section protection, and send the judgment result to the switching module 105. The performance parameters of the service signal might be any one or more of the following terms: optical power, bit error rate or signal to noise ratio and so on. Take the optical power for example, assuming that the switching conditions configured for the multiplexing section protection are: the optical power value is less than a certain optical power threshold; the first judgment module 103 can detect the optical power value of the service signal in the working line, and compare the detection result with the optical power threshold, and when the optical power value of the service signal is greater than or equal to the optical power threshold, it can determine that the working line is normal, and when the optical power value of the service signal is less than the optical power threshold, it can determine that the work line is abnormal, that is, the switching conditions are met, and the optical network protection device outputs the service signal in the protection line. Of course, the first judgment module 103 can simultaneously detect a variety of performance parameter values of the service signal, so that the judgment result is made more accurate.

The second judgment module 104 is configured to judge whether the working line is normal or not according to the performance parameter values of the service signal in the working line as well as the switching conditions configured for the channel section protection when the protection type of the optical network is the channel section protection, and send the judgment result to the switching module 105. The performance parameter values of the service signal detected by the second judgment module 104 might be the same as or different from those detected by the first judgment module 103.

The switching module 105 might be respectively connected with the working line and the protection line and configured to take the service signal in the protection line as an output signal when the working line is abnormal. The working line abnormalities comprise a number of cases, such as the deterioration of service signal quality in the working line or the interruption of working line and so on due to the failure of the optical network device in the working line. The switching module 105 can use a protection switch to switch between the working line and the protection line.

It should be understood that, the optical network protection device in the aforementioned embodiment needs to store both the switching conditions configured for the multiplexing section protection and the switching conditions configured for the channel section protection, and the switching conditions can be configured by the manufacturer while ex-factory, and can be updated and configured by the external network management system based on user requirements at any time.

It has been already mentioned in the above embodiment that, the optical network protection device can determine the protection type of the optical network through a variety of methods that will be described in detail in the following.

The first method for determining the protection type of the optical network is: the optical network protection device can determine the protection type of the optical network by detecting the structure of the service signal.

Therefore, the determination module 102 is further configured to detect the structure of the service signal, and determine the protection type of the optical network according to the structure of the service signal. Under normal conditions, the transmitted service signal has the specific structure indicating the protection type of the optical network, and the optical network protection device analyzes the specific structure of the service signal to determine the protection type of the optical network. For example, the protection type of the optical network can be determined by detecting the frame structure of the service signal.

The second method for determining the protection type of the optical network is: the optical network protection device can determine the protection type of the optical network according to the configuration of the external network management system or the instructions sent by the external network management system.

Figure 2:
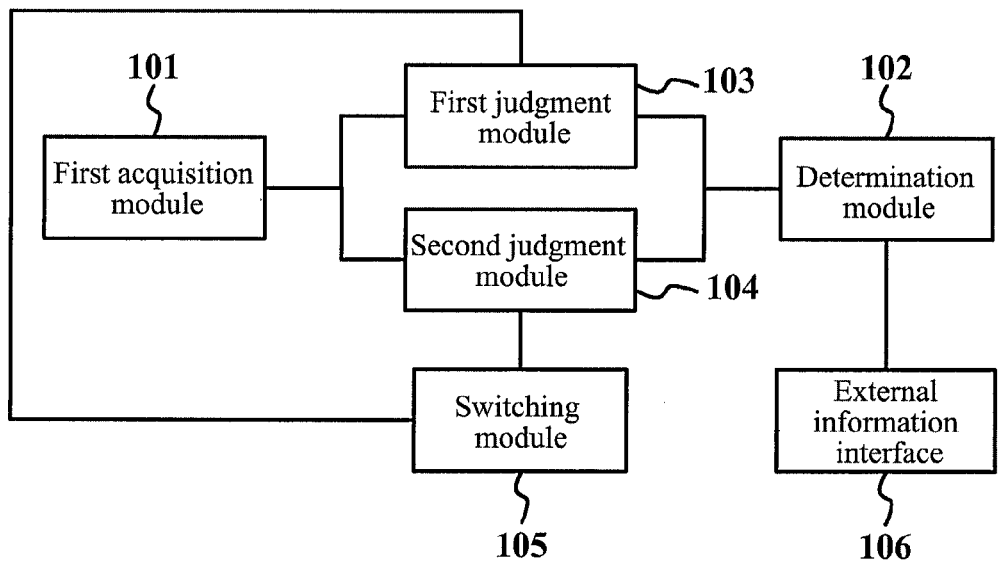
FIG. 2 is another structural schematic diagram of an optical network protection device in accordance with an embodiment of the present invention.

As shown in FIG. 2, it is another structural schematic diagram of the optical network protection device in accordance with an embodiment of the present invention, and on the basis of the embodiment shown in FIG. 1, the optical network protection device further comprises:

the external information interface 106, configured to connect with the external network management system.

The determination module 102, further configured to determine the protection type of the optical network according to the network configuration data configured by the network management system, or the APS (Automatic Protection Switching) instruction signaling, which is sent by the network management system, received via the external information interface 106.

In addition, the optical network protection device can be applicable to both the multiplexing section protection and the channel section protection, so it does not need to consider whether the optical network protection device is applicable to the multiplexing section protection or the channel section protection during the network configuration, thus improving the network configuration efficiency.

Before the switching operation is executed, it also needs to judge whether the protection line is normal or not, and if the protection line is normal, the switching operation is executed and the service signal in the protection line is output, and if the protection line is abnormal, it does not need to execute the switching operation.

Figure 3:
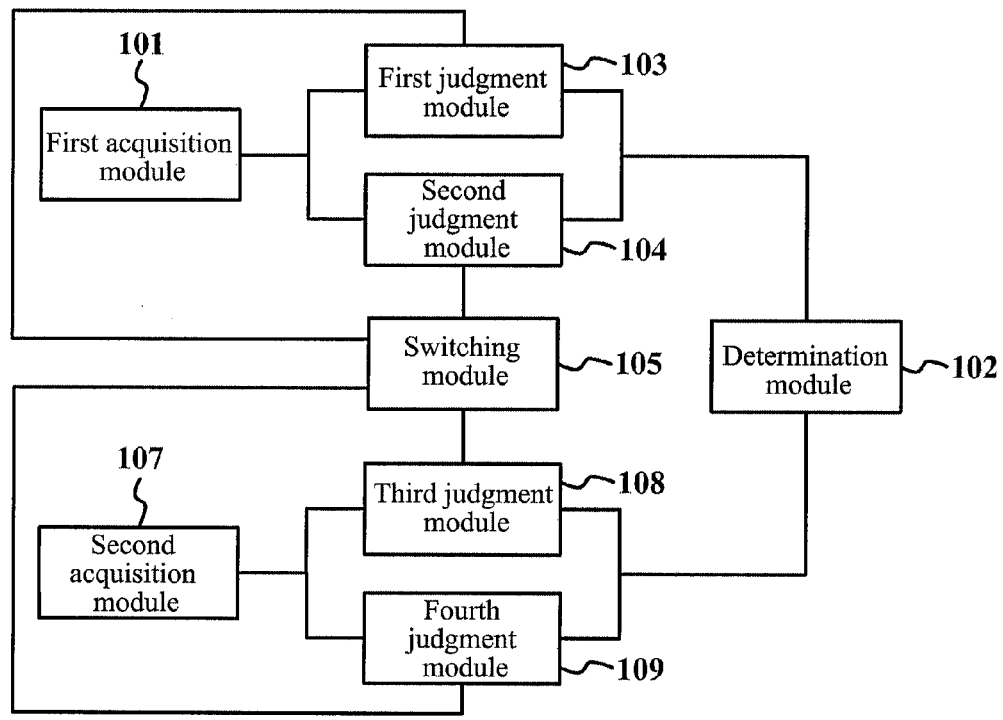
FIG. 3 is still another structural schematic diagram of an optical network protection device in accordance with an embodiment of the present invention.

As shown in FIG. 3, it is still another structural schematic diagram of the optical network protection device according to an embodiment of the present invention, and on the basis of the embodiment shown in FIG. 1, the optical network protection device further comprises:

the acquisition module 107, configured to acquire the service signal in the protection line;

the third judgment module 108, configured to judge whether the protection line is normal or not according to the performance parameter values of the service signal in the protection line as well as the switching conditions for the multiplexing section protection when the protection type of the optical network is the multiplexing section protection, and send the judgment result to the switching module 105;

the fourth judgment module 109, configured to judge whether the protection line is normal or not according to the performance parameter values of the service signal in the protection line as well as the switching conditions configured for the channel section protection when the protection type of the optical network is the channel section protection, and send the judgment result to the switching module 105.

The switching module 105 is further configured to: when the working line is abnormal and the protection line is normal, take the service signal in the protection line as the output signal.

In addition, when the working line recovers to normal, the switching module 105 also needs to re-execute the switching operation, and switch to the working line, that is, take the service signal in the working line as an output signal.

In the aforementioned embodiment, the optical network protection device might acquire the service signal in the protection line after determining that the working line is abnormal, and judge whether the protection line is normal or not, and execute the switching operation after determining that the protection line is normal.

Of course, the optical network protection device might also acquire the service signals in both the working line and the protection line simultaneously, and respectively judge whether the working line and the protection line are normal or not, and when the working line is abnormal and the protection line is normal, it switches to the protection line timely. In addition, in that way, the working condition of the protection line can also be obtained in real time, when the protection line is abnormal, an alarm can be sent to acquire timely maintenance.

With the optical network protection device provided in the aforementioned embodiment, it is able to determine the protection type of the optical network, and when the protection type of the optical network is the multiplexing section protection, the switching conditions configured for the multiplexing channel protection are used to judge whether the working line is normal or not; when the protection type of the optical network is the channel section protection, the switching conditions configured for the channel section protection are used to judge whether the working line is normal or not, that is, the optical network protection device can be applied to both the multiplexing section protection and the channel section protection, thus reducing the types of optical network protection devices, saving the costs, and improving the network configuration efficiency. In addition, the scheme of the present invention can be implemented by software rather than carry out the modification of hardware for the existing optical network protection devices, thus saving the costs.

Figure 4:
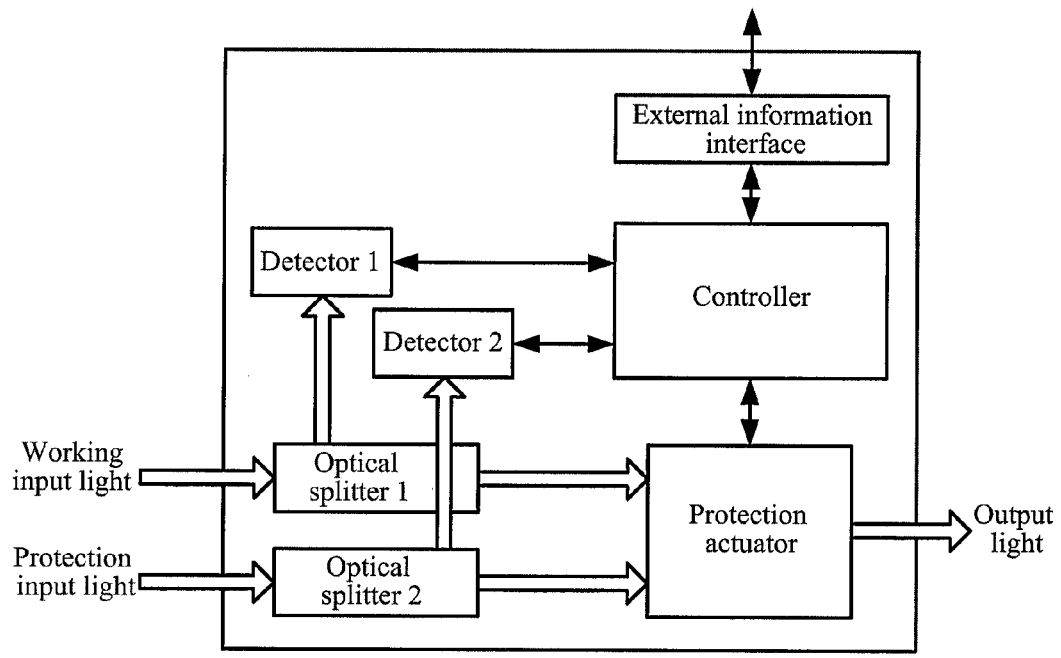
FIG. 4 is a schematic diagram of a specific application scenario of the optical network protection device in accordance with an embodiment of the present invention.

FIG. 4 shows a specific application scenario of the optical network protection device in accordance with an embodiment of the present invention, and the optical network protection device comprises: the optical splitter 1, the optical splitter 2, the protection actuator, the controller, the detector 1, the detector 2 and the external information interface.

The service signal transmission line in which the optical splitter 1 is located is the working line, and the service signal transmission line in which the optical splitter 2 is located is the protection line, the optical splitter 1 and the optical splitter 2 are respectively equivalent to the first acquisition module 101 and the second acquisition module 107 in the aforementioned embodiment and are respectively configured to split the service signals in the working line and the protection line, that is, respectively acquire the service signals in the working line and the protection line. In FIG. 4, the working input light refers to the service signal in the working line, and the protection input light refers to the service signal in the protection line, and the output light refers to the service signal output by the optical network protection device, and it might be the working input light or the protection input light.

The protection actuator is equivalent to the switching module 105 in the aforementioned embodiment, and it is respectively connected with the working line and the protection line, and is configured to switch between the working input light and the protection input light under the control of the controller, so as to achieve the function of the optical network protection. Specifically, when the working line is normal, take the service signal in the working line as the output signal, and take the service signal in the protection line as the output signal when the working line is abnormal and the protection line is normal.

The functions executed by the controller mainly comprise: Firstly, decide whether the protection type of the optical network is the multiplexing section protection or the channel section protection, so as to determine whether to acquire the switching conditions configured for the multiplexing section protection or the switching conditions configured for the channel section protection currently, and feed them back to the detector. Secondly, when the detector determines that the switching conditions are met, it controls the protection actuator to perform the switching between the working line and the protection line.

The detector 1 is connected with the optical splitter 1 and its functions mainly comprise: firstly, it can be used to detect the service signal provided by the optical splitter 1; secondly, according to the switching conditions configured for the multiplexing section protection fed back by the controller, it judges whether the switching conditions are met or not, and feeds back the judgment results to the controller. The detector 1 is equivalent to the first judgment module 103 in the aforementioned embodiment.

The detector 2 is connected with the optical splitter 2 and its functions mainly comprise: firstly, it can be used to detect the service signal provided by the optical splitter 2; secondly, according to the switching conditions configured for the channel section protection fed back by the controller, it judges whether the switching conditions are met or not, and feeds back the judgment result to the controller. The detector 2 is equivalent to the second judgment module 104 in the aforementioned embodiment.

The external information interface is equivalent to the external information interface 106 in the aforementioned embodiment, and is used to connect with the external network management system.

In the aforementioned embodiment, the controller might be connected with a plurality of protection actuators, that is, it can control the switching of multiple pairs of working lines and protection lines.

Figure 5:
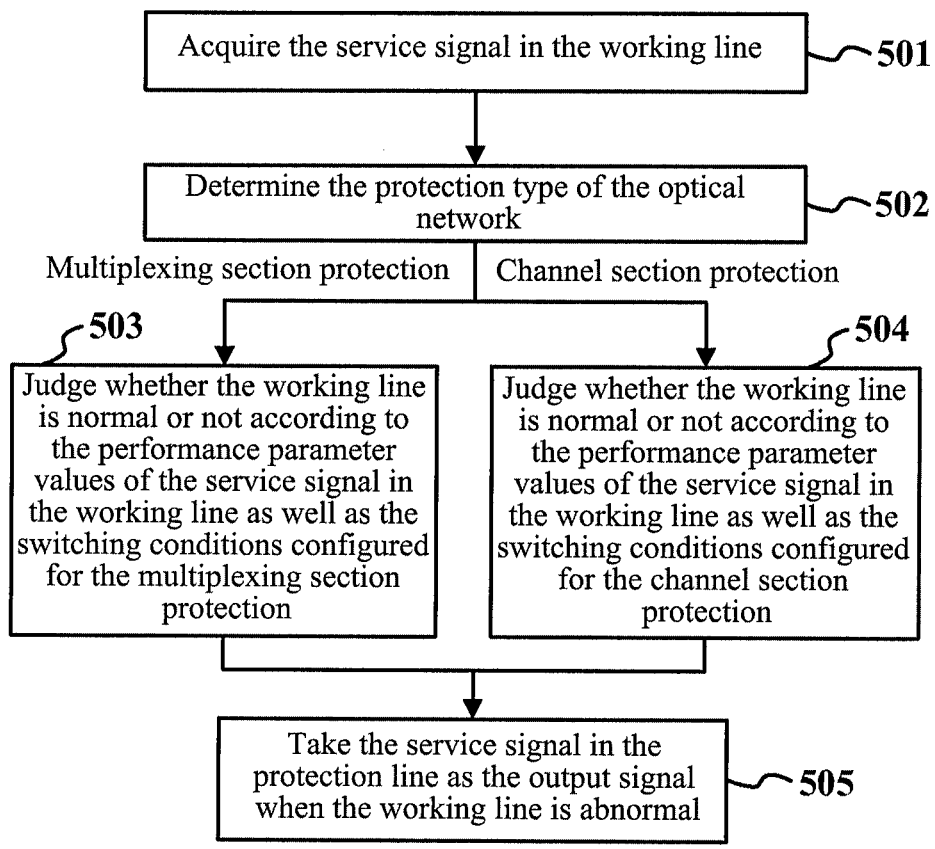
FIG. 5 is a flow chart of an optical network protection method in accordance with an embodiment of the present invention.

FIG. 5 shows a flow chart of an optical network protection method in accordance with an embodiment of the present invention, and the optical network protection method is applied in the optical network protection device in the aforementioned embodiment, and the optical network protection device comprises the working line and the protection line, and the optical network protection method comprises the following steps:

in step 501, the optical network protection device acquires the service signal in the working line.

In step 502, the optical network protection device determines the protection type of the optical network, and when the protection type of the optical network is the multiplexing section protection, proceed to step 503, and when the protection type of the optical network is the channel section protection, proceed to step 504.

The optical network protection device determines the protection type of the optical network through a variety of methods, for example, the optical network protection device can detect the structure of the service signal, and determine the protection type of the optical network according to the structure of the service signal; alternatively, the optical network protection device determines the protection type of the optical network according to the network configuration data configured by the external network management system or the APS instruction signaling sent by said network management system.

In step 503, the optical network protection device judges whether the working line is normal or not according to the performance parameter values of the service signal in the working line as well as the switching conditions configured for the multiplexing section protection, and when the working line is abnormal, proceed to step 505, otherwise it ends. The performance parameters of the service signal might be one or more of optical power, bit error rate or signal to noise ratio and so on.

In step 504, the optical network protection device judges whether the working line is normal or not according to the performance parameter values of the service signal in the working line as well as the switching conditions configured for the channel section protection, and when the working line is abnormal, proceed to step 505, otherwise it ends.

In step 505, the optical network protection device takes the service signal in the protection line as the output signal when the working line is abnormal.

The working line abnormalities comprise a number of cases: such as the deterioration of service signal quality in the working line or the interruption of working line and so on due to the failure of the optical network device in the working line. The optical network protection device can use a protection switch to switch between the working line and the protection line.

In addition, before the switching operation is executed, it is further judged whether the protection line is normal or not, and if the protection line is normal, the switching operation is executed and the service signal in the protection line is output, and if the protection line is abnormal, it does not need to execute the switching operation.

Figure 6:
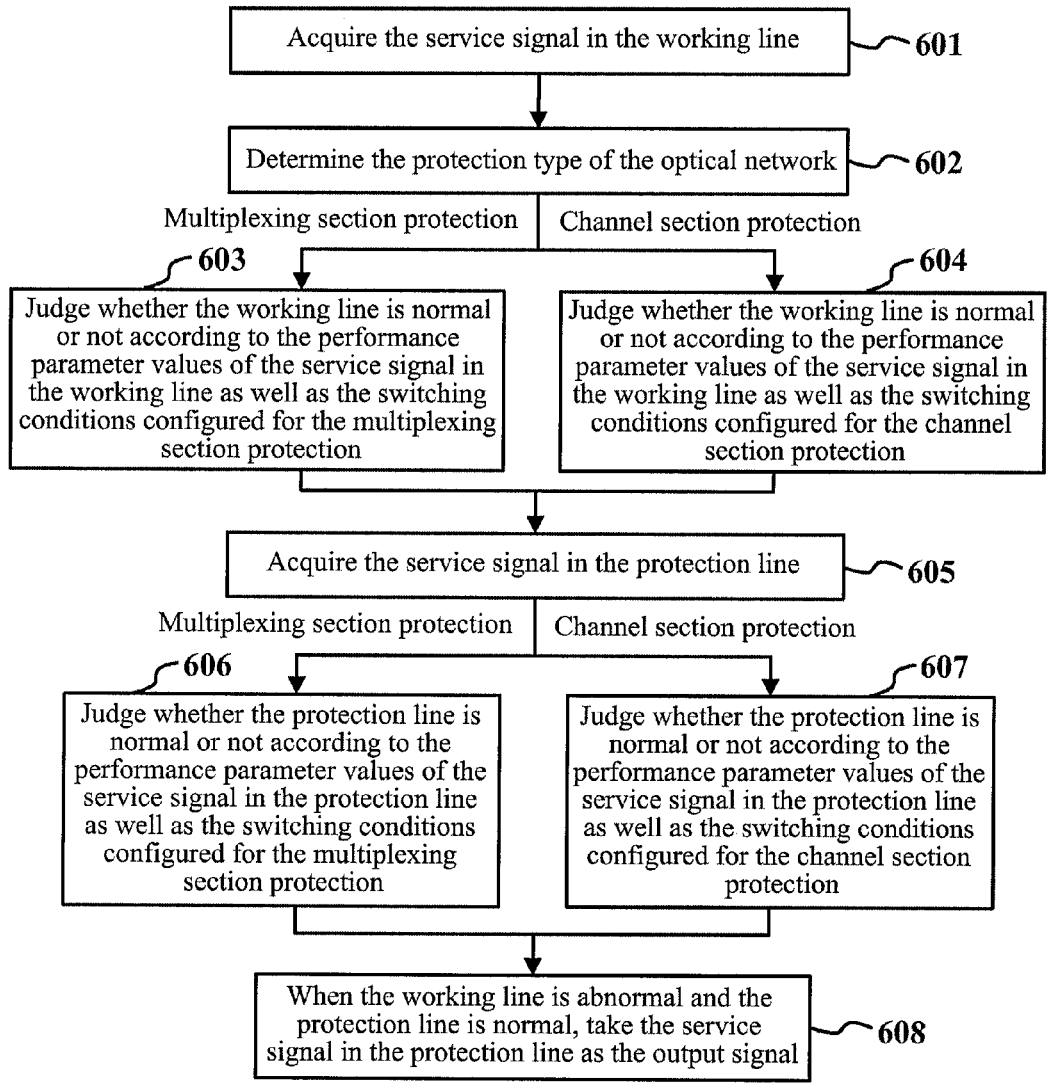
FIG. 6 is another flow chart of an optical network protection method in accordance with an embodiment of the present invention.

After determining that the working line is abnormal, the optical network protection device acquires the service signal in the protection line to judge whether the protection line is normal or not, and when determining that the protection line is normal, it executes the switching operation. FIG. 6 shows another flow chart of the optical network protection method in accordance with an embodiment of the present invention, and the optical network protection method comprises the following steps:

In step 601, the optical network protection device acquires the service signal in the working line.

In step 602, the optical network protection device determines the protection type of the optical network, and when the protection type of the optical network is the multiplexing section protection, proceed to step 603, and when the protection type of the optical network is the channel section protection, proceed to step 604.

In step 603, the optical network protection device judges whether the working line is normal or not according to the performance parameter values of the service signal in the working line as well as the switching conditions configured for the multiplexing section protection, and when the working line is abnormal, proceed to step 605, otherwise it ends.

In step 604, the optical network protection device judges whether the working line is normal or not according to the performance parameter values of the service signal in the working line as well as the switching conditions configured for the channel section protection, and when the working line is abnormal, proceed to step 605, otherwise it ends.

In step 605, the optical network protection device acquires the service signal in the protection line.

At this point, the optical network protection device can also detect the service signal in the protection line, and then determine the protection type of the optical network again, and if the determined protection type of the optical network is consistent with the protection type of the optical network determined in the aforementioned step 602, proceed to the subsequent steps, otherwise it ends, meanwhile an alarm might be sent.

In step 606, when the protection type of the optical network is the multiplexing section protection, the optical network protection device judges whether the protection line is normal or not according to the performance parameter values of the service signal in the protection line as well as the switching conditions configured for the multiplexing section protection. When the protection line is normal, proceed to step 608, and when the protection line is not normal, the switching operation is not executed and an alarm can be sent at the same time.

In step 607, when the protection type of the optical network is the channel section protection, the optical network protection device judges whether the protection line is normal or not according to the performance parameter values of the service signal in the protection line as well as the switching conditions configured for the channel section protection. When the protection line is normal, proceed to step 608, and when the protection line is not normal, the switching operation is not executed and an alarm can be sent at the same time.

In step 608, when the working line is abnormal and the protection line is normal, the optical network protection device takes the service signal in the protection line as the output signal.

Figure 7:
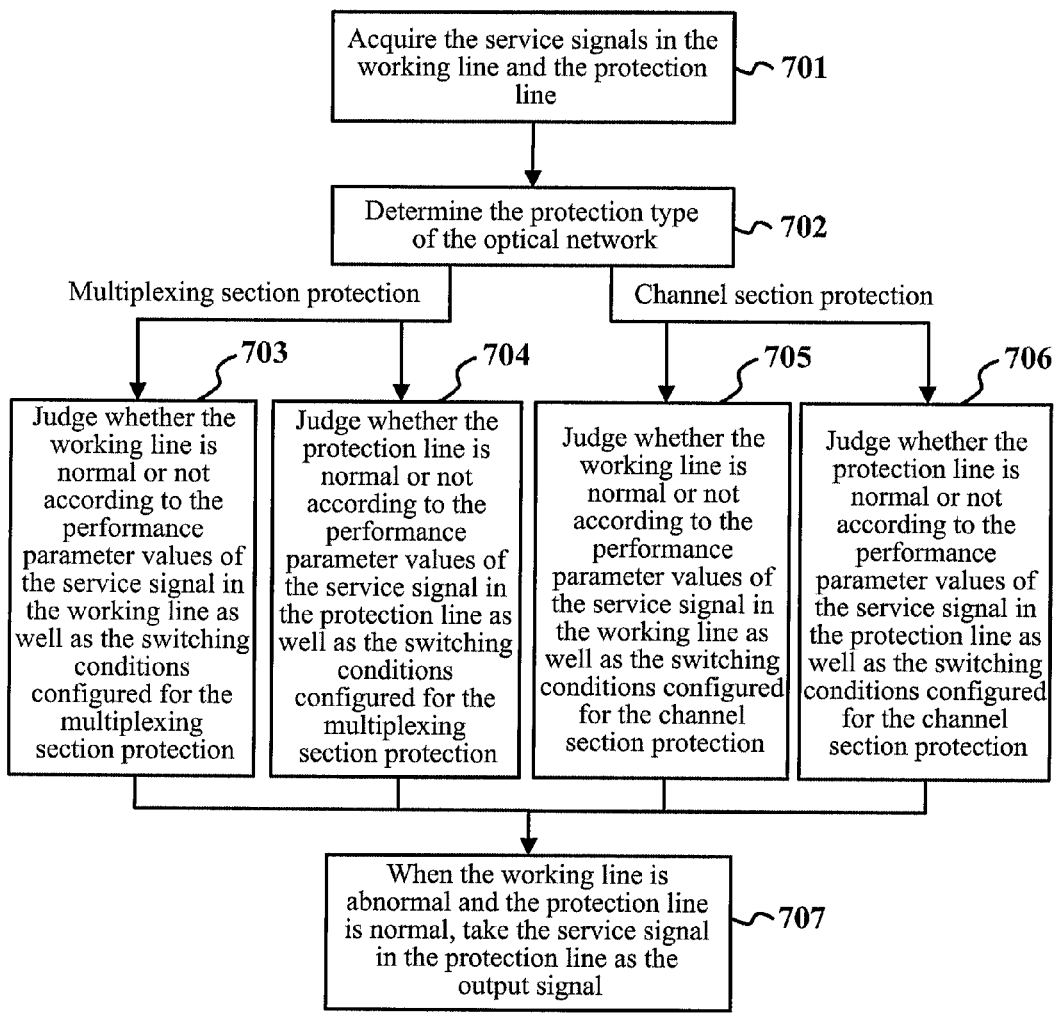
FIG. 7 is still another flow chart of an optical network protection method in accordance with an embodiment of the present invention.

In addition, the optical network protection device might also obtain the service signals in both the working line and the protection line simultaneously, and respectively judge whether the working line and the protection line are normal or not, and when the working line is abnormal and the protection line is normal, it switches to the protection line timely. In addition, the working condition of the protection line can be acquired in real time with this method, and when the protection line is abnormal, an alarm is sent so as to acquire timely maintenance. As shown in FIG. 7, it is still another flow chart of the optical network protection method in accordance with an embodiment of the present invention, and the optical network protection method comprises the following steps:

In step 701, the optical network protection device acquires the service signals in the working line and the protection line.

In step 702, the optical network protection device determines the protection type of the optical network, and when the protection type of the optical network is the multiplexing section protection, proceed to steps 703 and 704, and when the protection type of the optical network is the channel section protection, proceed to steps 705 and 706.

In step 703, the optical network protection device judges whether the working line is normal or not according to the performance parameter values of the service signal in the working line as well as the switching conditions configured for the multiplexing section protection.

In step 704, the optical network protection device judges whether the protection line is normal or not according to the performance parameter values of the service signal in the protection line as well as the switching conditions configured for the multiplexing section protection.

There is no execution order for the aforementioned steps 703 and 704 and they can be executed at the same time.

In step 705, the optical network protection device judges whether the working line is normal or not according to the performance parameter values of the service signal in the working line as well as the switching conditions configured for the channel section protection.

In step 706, the optical network protection device judges whether the protection line is normal or not according to the performance parameter values of the service signal in the protection line as well as the switching conditions configured for the channel section protection.

There is no execution order for the aforementioned steps 705 and 706 and they can be executed at the same time.

In step 707, when the working line is abnormal and the protection line is normal, the optical network protection device takes the service signal in the protection line as the output signal.

With the optical network protection method provided through the aforementioned embodiment, it is able to determine the protection type of the optical network, and when the protection type of the optical network is the multiplexing section protection, the switching conditions configured for the multiplexing section protection are used to judge whether the working line is normal or not; when the protection type of the optical network is the channel section protection, the switching conditions configured for the channel section protection are used to judge whether the working line is normal or not, that is, the optical network protection device can be applied to both the multiplexing section protection and the channel section protection, thus reducing the types of optical network protection devices, saving the costs, and improving the network configuration efficiency. In addition, the scheme of the present invention can be implemented by software rather than carry out the modification of hardware for the existing optical network protection devices, thus saving the costs.

The above description is only the preferred embodiments of the present invention, and it should be pointed out that for those skilled in the field, various modifications and variations can be made without departing from the principle of the present invention, and these modifications and variations should be considered as falling into the protection scope of the present invention.

What is claimed is:

1. An optical network protection device, comprising a working line and a protection line, characterized in that the device further comprises:
   a determination module, configured to determine a protection type of an optical network;
   a first judgment module, configured to judge whether the working line is normal or not according to performance parameter values of service signal in the working line as well as switching conditions configured for multiplexing section protection when the protection type of the optical network is the multiplexing section protection;
   a second judgment module, configured to judge whether the working line is normal or not according to the performance parameter values of the service signal in the working line as well as the switching conditions configured for channel section protection when the protection type of the optical network is the channel section protection;
   a switching module, configured to take the service signal in the protection line as an output signal when the working line is abnormal.

2. The optical network protection device of claim 1, wherein the determination module is specifically configured to: detect a structure of the service signal, and determine the protection type of the optical network according to the structure of the service signal.

3. The optical network protection device of claim 2, wherein the optical network protection device further comprises:
   a third judgment module, configured to judge whether the protection line is normal or not according to the performance parameter values of the service signal in the protection line as well as the switching conditions configured for the multiplexing section protection when the protection type of the optical network is the multiplexing section protection;
   a fourth judgment module, configured to judge whether the protection line is normal or not according to the performance parameter values of the service signal in the protection line as well as the switching conditions configured for the channel section protection when the protection type of the optical network is the channel section protection.

4. The optical network protection device of claim 3, wherein,
   the switching module is specifically configured to: when the working line is abnormal and the protection line is normal, take the service signal in the protection line as the output signal; and/or,
   the optical network protection device further comprises: a second acquisition module configured to acquire the service signal in the protection line.

5. The optical network protection device of claim 1, wherein said optical network protection device further comprises: a first acquisition module and/or an external information interface,
   the first acquisition module is configured to acquire the service signal in the working line;
   the external information interface is configured to connect with an external network management system; the determination module is further configured to determine the protection type of the optical network according to network configuration data configured by the network management system, or an automatic protection switching instruction signaling sent by the network management system.

6. The optical network protection device of claim 5, wherein the optical network protection device further comprises:
   a third judgment module, configured to judge whether the protection line is normal or not according to the performance parameter values of the service signal in the protection line as well as the switching conditions configured for the multiplexing section protection when the protection type of the optical network is the multiplexing section protection;
   a fourth judgment module, configured to judge whether the protection line is normal or not according to the performance parameter values of the service signal in the protection line as well as the switching conditions configured for the channel section protection when the protection type of the optical network is the channel section protection.

7. The optical network protection device of claim 6, wherein,
   the switching module is specifically configured to: when the working line is abnormal and the protection line is normal, take the service signal in the protection line as the output signal; and/or,
   the optical network protection device further comprises: a second acquisition module configured to acquire the service signal in the protection line.

8. The optical network protection device of claim 1, wherein the optical network protection device further comprises:
   a third judgment module, configured to judge whether the protection line is normal or not according to the performance parameter values of the service signal in the protection line as well as the switching conditions configured for the multiplexing section protection when the protection type of the optical network is the multiplexing section protection;
   a fourth judgment module, configured to judge whether the protection line is normal or not according to the performance parameter values of the service signal in the protection line as well as the switching conditions configured for the channel section protection when the protection type of the optical network is the channel section protection.

9. The optical network protection device of claim 8, wherein,
   the switching module is specifically configured to: when the working line is abnormal and the protection line is normal, take the service signal in the protection line as the output signal; and/or,
   the optical network protection device further comprises: a second acquisition module configured to acquire the service signal in the protection line.

10. An optical network protection method, applied in an optical network protection device, the optical network protection device comprising a working line and a protection line, characterized in that the method comprises following steps of:

the optical network protection device determining a protection type of an optical network;

when the protection type of the optical network is multiplexing section protection, the optical network protection device judging whether the working line is normal or not according to performance parameter values of service signal in the working line as well as switching conditions configured for the multiplexing section protection;

when the protection type of the optical network is channel section protection, the optical network protection device judging whether the working line is normal or not according to the performance parameter values of the service signal in the working line as well as the switching conditions configured for the channel section protection;

when the working line is abnormal, the optical network protection device taking the service signal in the protection line as an output signal.

11. The optical network protection method of claim 10, wherein the optical network protection device determines the protection type of the optical network, which is specifically:

the optical network protection device detecting a structure of the service signal, and determining the protection type of the optical network according to the structure of the service signal.

12. The optical network protection method of claim 11, wherein the method further comprises:

when the protection type of the optical network is the multiplexing section protection, the optical network protection device judging whether the protection line is normal or not according to the performance parameter values of the service signal in the protection line as well as the switching conditions configured for the multiplexing section protection;

when the protection type of the optical network is the channel section protection, the optical network protection device judging whether the protection line is normal or not according to the performance parameter values of the service signal in the protection line as well as the switching conditions configured for the channel section protection.

13. The optical network protection method of claim 12, wherein the optical network protection device switches to the protection line when the working line is abnormal, which is specifically:

the optical network protection device takes the service signal in the protection line as the output signal when the working line is abnormal and the protection line is normal.

14. The optical network protection method of claim 10, wherein the optical network protection device determines the protection type of the optical network, which is specifically:

the optical network protection device determining the protection type of the optical network according to network configuration data configured by network management system or an automatic protection switching instruction signaling sent by the network management system.

15. The optical network protection method of claim 14, wherein the method further comprises:

when the protection type of the optical network is the multiplexing section protection, the optical network protection device judging whether the protection line is normal or not according to the performance parameter values of the service signal in the protection line as well as the switching conditions configured for the multiplexing section protection;

when the protection type of the optical network is the channel section protection, the optical network protection device judging whether the protection line is normal or not according to the performance parameter values of the service signal in the protection line as well as the switching conditions configured for the channel section protection.

16. The optical network protection method of claim 15, wherein the optical network protection device switches to the protection line when the working line is abnormal, which is specifically:

the optical network protection device takes the service signal in the protection line as the output signal when the working line is abnormal and the protection line is normal.

17. The optical network protection method of claim 10, wherein the method further comprises:

when the protection type of the optical network is the multiplexing section protection, the optical network protection device judging whether the protection line is normal or not according to the performance parameter values of the service signal in the protection line as well as the switching conditions configured for the multiplexing section protection;

when the protection type of the optical network is the channel section protection, the optical network protection device judging whether the protection line is normal or not according to the performance parameter values of the service signal in the protection line as well as the switching conditions configured for the channel section protection.

18. The optical network protection method of claim 17, wherein the optical network protection device switches to the protection line when the working line is abnormal, which is specifically:

the optical network protection device takes the service signal in the protection line as the output signal when the working line is abnormal and the protection line is normal.

* * * * *